United States Patent

Rose et al.

(10) Patent No.: US 6,291,406 B1
(45) Date of Patent: Sep. 18, 2001

(54) METHOD FOR TREATING SUBTERRANEAN FORMATIONS

(75) Inventors: Gene D. Rose; Gordon McCann, both of Midland, MI (US)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 09/406,860

(22) Filed: Sep. 27, 1999

Related U.S. Application Data

(60) Provisional application No. 60/104,169, filed on Oct. 12, 1998.

(51) Int. Cl.$^7$ ................ C09K 3/00; E21B 43/26
(52) U.S. Cl. ............. 507/239; 507/244; 507/245; 507/255; 507/259; 507/261; 507/265; 507/922; 166/308
(58) Field of Search ............... 507/129, 131, 507/132, 133, 239, 245, 244, 922, 255, 259, 261, 265; 166/308

(56) References Cited

U.S. PATENT DOCUMENTS

| | | | |
|---|---|---|---|
| 2,900,336 | * 8/1959 | Brown | 507/129 |
| 2,900,337 | * 8/1959 | Earley | 507/129 |
| 3,125,517 | * 3/1964 | Voda | 507/131 |
| 3,378,074 | 4/1968 | Kiel. | |
| 3,552,494 | 1/1971 | Kiel. | |
| 3,692,676 | 9/1972 | Culter et al.. | |
| 3,710,865 | 1/1973 | Kiel. | |
| 3,977,472 | 8/1976 | Graham et al.. | |
| 4,233,165 | * 11/1980 | Salathiel et al. | 507/129 |
| 4,442,897 | 4/1984 | Crowell. | |
| 4,614,435 | 9/1986 | McIntire. | |
| 4,671,665 | 6/1987 | McIntire. | |
| 4,776,966 | 10/1988 | Baker. | |
| 4,802,141 | 1/1989 | Stegemoeller et al.. | |
| 4,850,701 | 7/1989 | Stegemoeller et al.. | |
| 4,886,367 | 12/1989 | Bragg et al.. | |
| 4,897,990 | 2/1990 | Nishimura et al.. | |
| 4,919,540 | 4/1990 | Stegemoeller et al.. | |
| 5,254,531 | * 10/1993 | Mueller et al. | 507/131 |
| 5,256,331 | * 10/1993 | Heitner | 507/131 |
| 5,620,946 | 4/1997 | Jahnke et al.. | |
| 5,633,220 | 5/1997 | Cawiezel et al.. | |
| 5,905,061 | * 5/1999 | Patel | 507/129 |
| 5,977,031 | * 11/1999 | Patel | 507/129 |
| 5,985,800 | * 11/1999 | Patel | 507/129 |

FOREIGN PATENT DOCUMENTS

| | | |
|---|---|---|
| 0 561 607 A2 | 9/1993 | (EP). |
| 0 561 608 A2 | 9/1993 | (EP). |
| WO 98/05733 | 2/1998 | (WO). |

OTHER PUBLICATIONS

Economides and Nolte, Section 5–9, *Reservoir Stimulation*, Schlumberger Educational Services, 1987, pp. 5–18 through 5–22.

Patton, T. C., Paint and Pigment Dispersions, Second Ed., John Wiley & Sons, 1979, pp. 468–469.

* cited by examiner

*Primary Examiner*—Philip Tucker

(57) ABSTRACT

A well treatment fluid such as a fracturing fluid or drilling fluid which comprises a water-in-oil emulsion containing an amine or amine oxide surfactant of the following formula:

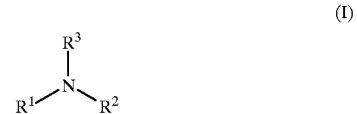

(I)

or a protonated form thereof

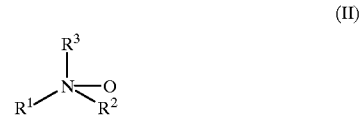

(II)

wherein $R^3$ is a hydrocarbyl or substituted hydrocarbyl having from about 8 to about 30 carbon atoms, and $R^1$ and $R^2$ are independently hydrogen, a hydrocarbyl or substituted hydrocarbyl having up to 30 carbon atoms.

22 Claims, No Drawings

METHOD FOR TREATING SUBTERRANEAN FORMATIONS

CROSS-REFERENCE TO RELATED APPLICATIONS

This application claims priority on provisional application U.S. Ser. No. 60/104,169 filed Oct. 12, 1998.

BACKGROUND OF THE INVENTION

The present invention relates to the treatment of subterranean formations and fluids useful in such treatment. More particularly, the present invention relates to drilling operations and to fracturing operations and their use in the recovery of hydrocarbons from subterranean formations.

In the recovery of fluids such as crude oil or natural gas from subterranean formations, various materials are added to the well bore and/or subterranean formation to improve the efficiency of the well drilling operation, to increase production of the fluids from the formation, or to terminate and seal a non-producing well. These treating agents are generally added above ground and flowed through the well bore to the subterranean formation. Often, these treating agents contain a particulate matter.

After drilling is complete and to stimulate hydrocarbon recovery, it is common to fracture hydraulically the hydrocarbon-bearing formation to provide channels to facilitate the flow of hydrocarbons to the well bore. In fracturing, a fluid is introduced into the well at a rate and pressure sufficient to produce one or more fractures in the formation, or to enlarge or extend existing fractures. The fluid is generally a thickened fluid which contains a particulate material, commonly referred to as a proppant, such as sand, which is deposited in the fractures. The proppant remains in place within the fracture when the fracturing pressure is released to hold the fracture open.

An ideal fracturing fluid would comprise low friction loss in the well bore, low fluid loss in the fracture, high friction loss in the fracture, good proppant suspension capability, resist the temperatures encountered in the fracturing operation, and be easily recovered from the formation and fracture. High viscosity fluids have commonly been employed in order to transfer efficiently fracturing pressures to the rock, thereby tending to generate wide fractures of considerable length as well as to reduce fluid leak-off. In addition, they are capable of suspending large proppants in high concentrations.

A variety of high viscosity fluids have been proposed for use in hydraulic fracturing operations. For example, the fracturing fluid may comprise either a water or an oil-based fluid thickened with a polymer such as galactomannan gum, a cellulosic polymer or a synthetic polymer. Often, in order to effect the necessary increase in fluid viscosity, the polymeric thickeners must be present in relatively high concentrations. In addition, achieving a sufficiently high viscosity necessary for effective fracturing hinders the pumpability of the fluids.

In order to improve the pumpability of such fluids, various methods have been employed to delay the viscosity increase until the fluid is pumped to the desired location in the formation. One such method involves using a polymeric system which employs a delayed cross-linking agent such as a soluble organo-metallic salt. The fluid retains a low viscosity until the polymer is cross-linked by the metal ions. Upon cross-linking, the viscosity of the fluid substantially increases with coincident rheology improvement. Thus, the fluid can be pumped within the well bore at a relatively low viscosity and only at or near the subterranean formation is the polymer cross-linked.

Upon cross-linking, the fluid exhibits the advantageous properties of a thickened fluid. Unfortunately, polymer residues are retained in the formation, when using fluids thickened with a polymer, thereby reducing the effectiveness of the fracturing operation. In addition, a water-continuous fluid often reduces hydrocarbon recovery due to its incompatibility with the material being recovered.

It has been proposed, as another means for improving a fracturing operation, to use fracturing fluids (such as emulsions of water and oil) which are compatible with the existing fluids in the formation. For example, U.S. Pat. Nos. 3,710,865 and 3,977,472 teach using a stabilized oil-in-water emulsion as a fracturing fluid. In these systems, the discontinuous, internal oil phase typically constitutes from 50 to 80 volume percent of the emulsion. The continuous, water-external phase is stabilized by adding a water-dispersible polymeric thickening agent. These systems are relatively expensive due to the large amounts of oil employed. In addition, since a water-dispersible polymeric thickener is commonly employed in relatively high concentrations, the problem with polymer residues in the formation remains. Also, the water continuous phase is seen to be more damaging to the hydrocarbon bearing formation than are oil based fluids.

One method for reducing the amounts of oil while maintaining the benefit of an oil based fluid involves the use of an oil-external emulsion (i.e., a water-in-oil emulsion). To be more cost effective, water-in-oil emulsions should typically comprise less amounts of oil than the traditional oil-in-water emulsions. In addition, water-in-oil emulsions exhibit reduced interaction with unstable formations. However, the water-in-oil emulsions often exhibit extremely high viscosities which result in high friction resistance to their flow down the well bore. Also, upon the addition of sand, sintered bauxite or other proppant, there is a tendency for the water-in-oil emulsions to break or revert to two separate and continuous phases, thereby losing their advantage.

Methods for overcoming the increased friction due to the high viscosity of the water-in-oil emulsions at low temperatures have been proposed. For example, U.S. Pat. No. 3,378,074 describes a technique in which a lubricating annulus of water forms a physical barrier between the viscous water-in-oil emulsion and the well bore. However, this technique requires the use of a special well head equipment and fittings to create the conditions necessary to form an annulus of water. In addition, the problem of emulsion stability remains.

Another method for overcoming high friction pressure experienced in pumping a viscous water-in-oil emulsion is described in U.S. Pat. No. 4,233,165. In the disclosed method, a water-in-oil emulsion in amounts of 30 to 95 percent by volume is dispersed in an aqueous medium to reduce the overall friction pressure of the resultant dispersion to create a (water-in-oil)-in-water emulsion. The complications of this dual step dispersion process are apparent. In addition, the stability of the system is not necessarily enhanced.

U.S. Pat. No. 4,776,966 discloses a water-in-oil emulsion which comprises an emulsifying agent for the water-in-oil and a dispersing agent for the solid particulate matter. Unfortunately, relatively large amounts of both the emulsifying and dispersing agents must be employed. In addition, while large amounts of water are suggested (i.e., up to 90 percent), no more than 15 to 70 percent water is exemplified.

U.S. Pat. No. 5,633,220 teaches a high internal phase ratio water-in-oil emulsion containing an emulsifier selected from the group consisting of (a) a block or graft copolymer of the general formula $(A—COOO)_mB$, where m is an integer of at least 2, A is a polymeric component having a molecular weight of at least 500 and is the residue of an oil-soluble complex monocarboxylic acid and B is a polymeric component having a molecular weight of at least 500 and comprises a water soluble polyalkylene glycol; (b) the reaction product of a polyalk(en)yl succinic anhydride and a polar compound having at least one hydroxyl or amino group; and (c) mixtures thereof. However, the relatively high cost of such surfactants when used as the principal emulsifying surfactant is an economic deterrent to use of such fluids. Also, high internal phase emulsions in which such polymeric emulsifiers are the principal emulsifying surfactant have not proved stable to the addition of sand as a proppant at high shear conditions.

In view of the foregoing deficiencies with the methods for treating subterranean formations, particularly with water-in-oil emulsions, it remains desirable to provide an improved water-in-oil emulsion for treating subterranean formations.

SUMMARY OF THE INVENTION

Accordingly, in one aspect, the present invention is a fluid for treating subterranean formations. Specifically, the fluid is a water-in-oil emulsion comprising a first surfactant comprising an amine or amine oxide surfactant soluble in the oil phase of the emulsion and having the formula:

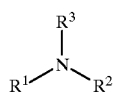

(I)

or a protonated form thereof

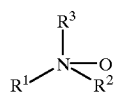

(II)

wherein $R^3$ is a hydrocarbyl or substituted hydrocarbyl having from about 8 to about 30 carbon atoms, and $—R^1$ and $—R^2$ are independently hydrogen, hydrocarbyl or substituted hydrocarbyl having up to 30 carbon atoms.

In an embodiment of the present invention, the well treatment fluid further comprises a particulate material. In a particular embodiment, the fluid is a fracturing fluid and the particulate material is a proppant.

In another embodiment of the present invention, the fluid further comprises at least one secondary surfactant selected from the group consisting of (i) at least one hydrocarbon soluble surfactant selected from the group consisting of

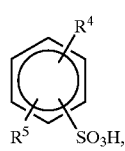

(III)

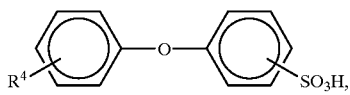

(IV)

and sulfonate salts of an acid of Formula III or IV, wherein $R^4$ is a hydrocarbyl or substituted hydrocarbyl having from about 18 to about 30 carbon atoms and $—R^5$ is hydrogen, $—CH_3$ or $—C_2H_5$, in which the major component of Formula III comprises a substituted benzene in which if $R^5$ is $—CH_3$ or $—C_2H_5$, the $R^4$ and $R^5$ groups are para to each other and the sulfonic acid group is ortho to $R^5$ and if $R^5$ is hydrogen the sulfonic acid group is para to $R^4$;

(ii) at least one hydrocarbon soluble, long-chain carboxylic acid surfactant of the formula RCOOH, wherein R is a hydrocarbyl or substituted hydrocarbyl having from 18 to 30 carbon atoms;

(iii) at least one surfactant selected from the group consisting of (a) an effective amount of a block or graft copolymer having the general formula $(A—COO)_mB$, where m is an integer of at least 2, A is a polymeric component having a molecular weight of at least five hundred and is the residue of an oil-soluble complex monocarboxylic acid and B is a polymeric component having a molecular weight of at lest five hundred and comprises a water soluble polyalkylene glycol, (b) the reaction product of a polyalk(en)yl succinic anhydride and a polar compound having at least one hydroxyl or amino group and ( c) mixtures of (a) and (b); and (iv) at least one block copolymer of butylene oxide/ ethylene oxide/butylene oxide.

In yet another aspect, the present invention is a method of fracturing a subterranean formation which comprises injecting into the formation, at a pressure sufficient to fracture the formation, a water-in-oil emulsion comprising a surfactant of Formula I or II and a proppant. The emulsion may further comprise a surfactant described in (i) through (iv) in the immediately preceding paragraph.

The water-in-oil emulsions exhibit relatively good stability, both at surface temperatures and temperatures often encountered down-hole, and have good carrying capacity for particulate material. The emulsion stability is maintained even at the high shear often employed for incorporating the proppant into the fluid. In addition, the ability of the emulsion to maintain its stability at the high temperatures to which it may be exposed down-hole is particularly enhanced when at least one of the sulfonate surfactant, the carboxylic acid surfactant, or one of the polymeric surfactants is employed in combination with the amine or amine oxide surfactant. Since low amounts of oil can be employed, the emulsions are relatively inexpensive. Moreover, since rheology control agents are not mandatory, recovery of the emulsion from the formations can be facilitated.

DETAILED DESCRIPTION OF THE INVENTION

The amine or amine oxide surfactant useful in the well treatment fluid of the present invention is a hydrocarbon soluble surfactant of the formula:

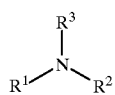

(I)

or a protonated form thereof

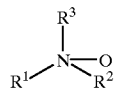

(II)

wherein $R^3$ is a hydrocarbyl or substituted hydrocarbyl having from about 8 to about 30 carbon atoms, and —$R^1$ and —$R^2$ are independently hydrogen, a hydrocarbyl or substituted hydrocarbyl having up to 30 carbon atoms, for example, —$CH_3$, —$C_2H_5$, —$C_3H_7$, —$(CH_2CH_2$—$O)_n H$, or —$[CH_2CH(CH_3)O]_n H$, wherein n is 1 to 4. Preferably, —$R^1$ and —$R^2$ are not both hydrogen. Preferably, $R^1$ and R2 are independently hydrogen, —$CH_3$, —$C_2H_5$, —$C_3H_7$, —$(C_2H_4)OH$, or —$CH_2CH(CH_3)OH$ provided —$R^1$ and —$R^2$ are not both hydrogen. By "substituted hydrocarbyl" in the context of $R^3$ it is meant $R^3$ may be a hydrocarbyl substituted, either in the hydrocarbyl chain or pendant from the chain, with a group which does not destroy the solubility of the amine in the oil phase of the emulsion. In general, if substituted, $R^3$ is substituted in the chain with —NHC(=O)—, —O—, or —$NR^6$, where $R^6$ is hydrogen, —$CH_3$, —$C_2H_5$, —$C_3H_7$, —$(C_2H_4)OH$, or —$CH_2CH(CH_3)OH$ wherein n is 1 to 4. Preferably, $R^3$ is an aliphatic or substituted aliphatic hydrocarbyl having at least about 12 and up to about 24 carbon atoms. More preferably $R^3$ is an aliphatic group having at least about 12 carbon atoms and having up to about 22, and most preferably an aliphatic group having at least about 18 and no more than about 22 carbon atoms. Examples of representative amine surfactants corresponding to Formula I which may be employed in the practice of the present invention are listed in Table 1.

TABLE 1

| Chemical Description | Commercial Name (Source) |
| --- | --- |
| Erucyl diethanol amine | Kemamine AS-298 (Witco) |
| Tridecyl ether diaminopropane, | Adogen 583 (Sherex) |
| N-Oleyl alkyl-1,3-diaminopropane | Duomeen O (Akzo Nobel) |
| N-Tallow alkyl-1,3-diaminopropane | Duomeen T (Akzo Nobel) |
| bis(2-hydroxyethyl) tallowamine | Ethomeen T/12 (Akzo Nobel) |
| Octadecyl amidopropyl diethanol-amine | Experimental product RD-6058 (Akzo Nobel) |
| bis(2-hydroxyethyl) cocoamine | Ethomeen C/12 (Akzo Nobel) |
| bis(2-hydroxyethyl) oleyamine | Ethomeen O/12 (Akzo Nobel) |
| N,N',N'-tris(2-hydroxyethyl)-N-tallow-1,3-propanediamine | Ethoduomeen T/13 (Akzo Nobel) |
| N,N,N'-trimethyl-N'-tallow-1,3-propanediamine | Duomeen TTM (Akzo Nobel) |
| Erucyl dimethyl amine | Kemamine T-2982-D (Akzo Nobel) |
| Methyl octadecyl amine | Aldrich Chemical Company, Inc. |

An example of a representative amine oxide corresponding to Formula II which may be employed in the practice of the present invention is methyldicocoalkylamine oxide, which is commercially available as Aromox M2C. An example of a protonated form of the amine of Formula I is that which may be formed in situ by interaction of the amine with an acidic aqueous phase of the emulsion or an acidic surfactant such as a sulfonic acid of Formula III.

The water-in-oil emulsions of the present invention comprises an internal or discontinuous phase of an aqueous liquid dispersed throughout an external or continuous phase of a hydrocarbon liquid.

The internal or discontinuous, aqueous liquid phase of the water-in-oil emulsion phase may comprise any aqueous liquid including water (including aqueous liquids such as an alkaline or acidic aqueous solution, e.g., an aqueous solution of hydrochloric acid or sodium hydroxide); aqueous salt solutions such as brine, or aqueous salt solutions of at least one alkali metal halide or alkaline earth metal halide, such as potassium chloride, calcium chloride, calcium bromide or magnesium chloride; or a mixture of water and a small amount (i.e., less than 20 volume percent) of a water miscible liquid such as glycerol. Preferred aqueous liquids are fresh water, sea water and aqueous salt solutions of potassium chloride.

The external or continuous oil phase comprises a hydrocarbon liquid. Representative hydrocarbon liquids include crude oil or a refined petroleum fraction such as diesel oil, mineral oil, gas condensate, vegetable oils, gas oil, kerosene, or the like; hydrocarbons such as dodecylbenzene, benzene, toluene, ethylbenzene, cyclohexane, hexane, decane, hexadecane and the like. Non-toxic and/or biodegradable (synthetic) oils such as those oils sold as Exxon Escaid 110, Exxon Escaid WS2547, Conoco LDT200, and Henkel OMC 720 with low aromatic oil content such as described in U.S. Pat. No. 4,897,990 or similar oils as well as complex esters such as sold by NL Baroid under the trademark "Petrofree" may also be used as the hydrocarbon liquid. Compatible mixtures of any hydrocarbon liquids may also be employed. It is also possible to use substituted hydrocarbons as the oil phase. Preferred hydrocarbons include diesel oil, kerosene, and the synthetic oils, with diesel oil being most preferred.

The amount of the aqueous liquid and oil most advantageously employed in preparing the water-in-oil emulsions will be dependent on a variety of factors including the desired rheological properties at the different temperatures to be experienced by the fluid, the particulate material, if any, to be employed and the like. The oil phase will advantageously comprise less than about 10, preferably less than 5, more preferably less than about 2 percent, by volume, and the aqueous liquid phase will advantageously comprise at least about 90, more preferably at least about 95, and most preferably at least about 98, percent, by volume, said volume percents being based on the total volume of the water and oil used in the emulsion. Preferably, the oil is used in a minimal amount required to form a stable emulsion suitable for use in the desired application and environment. In general, the oil is employed in an amount of at least about 1 percent, by volume with the aqueous liquid being employed in an amount of less than 99 percent, by volume, said volume percents being based on the total volume of the aqueous liquid and oil used in the emulsion. Thus, the emulsions of the present invention are a type of high internal phase ratio water-in-oil emulsion.

The amine or amine oxide surfactant is most advantageously employed in an amount effective to provide a sufficiently stable emulsion at the condition to which the water-in-oil is exposed and the desired rheological properties at those conditions. This amount will vary depending on the specific aqueous liquid and oil employed, the desired rheology and the end use application of the well treatment fluid. In general, the amine or amine oxide will be employed in an amount of at least about 0.04 weight percent based on the total weight of the emulsion (i.e., the water and oil, excluding particulate material). In general, the amine or amine oxide is advantageously employed in an amount greater than about 0.08, more preferably greater than about 0.2, weight percent based on the total weight of the emulsion. While the maximum amount of the amine or amine oxide surfactant which can most effectively be employed will vary, in general, the amine or amine oxide surfactant is advantageously employed in an amount of less than about 5, preferably less than about 2, and most preferably less than about 1, weight percent based on the weight of the emulsion.

Depending on the end use application of the well treatment fluid of the present invention and its desired properties, the water-in-oil emulsion may comprise a particulate material or proppant as well as other materials such as surfactants or thickeners. These additional materials and their amounts are selected to impart the desired rheological and other properties to the water-in-oil emulsion at the different temperatures to which the emulsion is exposed. When the well treatment fluid is to be used as a fracturing fluid, a particulate material or proppant will generally be employed. Any particulate material which can be effectively employed as a proppant in a fracturing operation can generally be employed in the practice of the present invention. Representative examples of proppants include sand, both treated and untreated, high-strength proppants such as sintered bauxite and zirconium oxide, intermediate-strength proppants, ceramics and the like. Additional information on proppants may be found in Section 5–9 of Economides and Nolte, *Reservoir Stimulation*, Schlumberger Educational Services, Houston, Tex. 1987, pages 5–18 through 5–22, the teachings of which are incorporated herein by reference. The particulate material advantageously has a particle size such that it passes through a 6 mesh screen but is stopped by a 70 mesh screen (U.S. Sieve Series, A.S.T.M. E11-87, corresponding to passing through a 3.35 mm screen and stopped by a 212 μm screen), with sand having a particle size from 6 to 20 mesh (3.35 mm/850 μm) (6/20 sand), 20/40 (850 μm/425 μm) and 40/70 (425 μm/212 μm) sands being preferred with sand having a particle size from 20 to 40 mesh (850 μm/425 μm) (20/40 sand) being more preferable. In general based on economic considerations, sand is preferably employed as the proppant in wells with low closure stress.

The amount of proppant most advantageously employed is dependent on a variety of factors including the specific fracturing operation, the specific proppant employed, the other components and their amounts, the method used to prepare the emulsion, and the desired properties of the water-in-oil emulsion. In general, when sand is the proppant, it is advantageously employed in an amount from about 0.1 to about 22, preferably from 0.25 to about 20, pounds per gallon of the emulsion.

In addition to the amine or amine oxide surfactant, other surfactants are often advantageously employed in the water-in-oil emulsion. The specific surfactant employed and its concentration are dependent on a variety of factors, particularly the type and amount, if any, of particulate material employed, and the desired properties of the emulsion. Advantageously, the additional surfactant employed in the present invention has an HLB value of less than about 12, preferably less than about 10. Representative of the other surfactants which can be employed include nonionic surfactant such as sorbitan monooleate (Span™ 80) and the Igepal™ surfactants such as nonyl phenol ethoxylates (e.g., Igepal 430) and anionic surfactants such as alkyl aryl sulfonic acid, and alkyl carboxylates such as oleic acid and erucic acid.

Depending on the temperature which may be encountered by the fluid down-hole, it may be desirable to include at least one secondary surfactant in the practice of the present invention to assist in maintaining the stability of the emulsion at the high temperatures experienced down-hole. One preferred surfactant for such purpose is at least one hydrocarbon soluble alkaryl sulfonic acid surfactant selected from the group consisting of

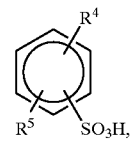

(III)

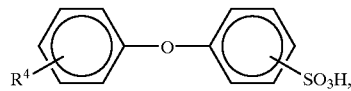

(IV)

and sulfonate salts of an acid of Formula III or IV, where $R^4$ is a hydrocarbyl or substituted hydrocarbyl having from about 18, preferably from about 20, carbon atoms to about 30, preferably to about 26, most preferably to about 24, carbon atoms and $R^5$ is hydrogen, methyl or ethyl, in which the major (more than 50 weight percent) component of Formula III comprises a substituted benzene in which if $R^5$ is —$CH_3$ or —$C_2H_5$, $R^4$ and $R^5$ are para to each other and the sulfonic acid group is ortho to $R^5$ and if $R^5$ is hydrogen the sulfonic acid group is para to $R^4$. Preferably $R^4$ is an hydrocarbyl having from about 20 to about 26 carbon atoms, more preferably an alkyl from about 20 to about 24 carbon atoms. Preferably $R^5$ is methyl. Examples of representative sulfonic acid surfactants corresponding to Formula III and Formula IV which may be employed in the practice of the present invention are listed in Table 2. An example of suitable sulfonate salt variations of Formula III and Formula IV are amine salts which may be formed in situ, e.g., by a base in the aqueous phase or upon contact of an alkaryl sulfonic acid surfactant with an amine of Formula I.

TABLE 2

| Chemical Description | Commercial Name (Source) |
|---|---|
| $C_{20-24}$ Alkyltoluene sulfonic acid | Aristol F (Pilot) |
| $C_{20-24}$ Alkylbenzene sulfonic acid | Sulfonated Aristol A (Pilot) |
| $C_{18}$ Alkyltoluene sulfonic acid | Aristol G (Pilot) |
| ~$C_{24}$ Alkylbenzene sulfonic acid | Paramins ECA 15067 (Exxon) |
| Alkylbenzene sulfonic acid | OS #100603 (Lubrizol) |
| Long chain alkarylsulfonic acid | OS #100604 (Lubrizol) |

TABLE 2-continued

| Chemical Description | Commercial Name (Source) |
|---|---|
| Long chain alkarylsulfonic acid | OS #100605 (Lubrizol) |
| $C_{20-24}$ Monoalkylated monosulfonated diphenyl oxide | |
| $C_{24-28}$ Alkyltoluene sulfonic acid | |

Another surfactant which may be employed to assist in maintaining the stability of the emulsion at high down-hole temperatures is at least one hydrocarbon soluble carboxylic acid surfactant of the formula RCOOH, wherein R is a hydrocarbyl or substituted hydrocarbyl having from about 18 to about 30 carbon atoms, e.g., erucic acid (commercially available as Emery 9835).

A third surfactant which may be employed to assist in maintaining the stability of the emulsion at high down-hole temperatures is at least one surfactant selected from the group consisting of (a) an effective amount of a block or graft copolymer having the general formula $(A-COO)_m B$, where m is an integer of at least 2, A is a polymeric component having a molecular weight of at least five hundred and is the residue of an oil-soluble complex monocarboxylic acid and B is a polymeric component having a molecular weight of at lest five hundred and comprises a water soluble polyalkylene glycol, (b) the reaction product of a polyalk(en)yl succinic anhydride and a polar compound having at least one hydroxyl or amino group and (c) mixtures of (a) and (b).

Such surfactants are disclosed in U.S. Pat. No. 5,633,220, the teachings of which are expressly incorporated herein in their entirety. Examples of such surfactants are Hypermer B246 and Hypermer E464 which are available from ICI Americas, Inc.

A fourth type of surfactant which may be employed in the present invention to assist in maintaining the stability of the emulsion at high down-hole temperatures is at least one block copolymer of butylene oxide/ethylene oxide/butylene oxide. A triblock surfactant having two butylene oxide blocks of about 29 units capping an ethylene oxide center block of about 25 units is of particular interest.

While the specific amounts of the sulfonic acid surfactant or other high temperature stabilizing surfactant most advantageously employed will vary depending on the specific surfactant employed and the desired properties of the resulting water-in-oil emulsion, when employed, it is generally employed in an amount from about 0.04 to about 5, preferably about 0.08 to about 2, and most preferably from about 0.2 to about 1, weight percent based on the total weight of the emulsion.

In addition, additives such as buffers, e.g., acetic acid; bacteriocides, e.g., glutaraldehyde; fluid loss additives, e.g., silica flour; and rheology control agents or friction reducers can be added to one or both phases of the water-in-oil emulsion for a number of reasons such as to increase the viscosity of the fracturing fluid, to delay the onset of turbulence, or to further stabilize the emulsion.

It is not normally necessary or desirable to use a rheology control additive, and in general, it is more advantageous to properly select the amount and type of oil, aqueous liquid and the amine or amine oxide surfactant and sulfonate or other additional surfactants. However, polymers, normally of relatively high molecular weight, which reduce the power-law flow index or reduce flow pipe friction due to turbulent motion or materials which serve to improve the viscosity index can be employed. Representative of polymers which will act as a thickener are polyisobutylmethacrylate, polymethylmethacrylate and polyisobutylene. In addition, commercial drag reducing chemicals such as those sold by Conoco Inc. under the trademark "CDR" as described in U.S. Pat. No. 3,692,676 or drag reducers such as those sold by Chemlink designated under the trademarks "FLO 1003, 1004, 1005 and 10080" can be employed.

The water-in-oil emulsion can be prepared using any of a number of different techniques suitable for preparing water-in-oil emulsions and the specific method for preparing the emulsion is not critical to the practice of the present invention. Such techniques are well-known in the art and reference is made thereto for the purposes of the present invention. In one method which is advantageously employed, the amine or amine oxide surfactant and, if employed, the aromatic sulfonate or other secondary surfactant employed to assist in thermal stability of the emulsion, as well as any other hydrocarbon soluble additives are added to the oil or hydrocarbon in the desired amount to form a solution in the oil. The aqueous liquid, including any water soluble additives, is then added to the resulting solution using agitation sufficient to prepare the desired water-in-oil emulsion. Such agitation may be provided by continuous-in-line mixers such as described in U.S. Pat. No. 5,663,220 at column 14, lines 30–39. Preferably, the agitation is sufficient such that the aqueous liquid will form droplets having an average diameter from about 0.01 to about 100 microns (micrometers), preferably from about 1 to about 50 microns. In general, the water-in-oil emulsions are prepared above ground prior to their injection into the well bore or the subterranean formation, although it is contemplated that the emulsions can be formed in the well bore or at another location within the formation.

If employed, the proppants or other particulate material is generally added only after the preparation of the water-in-oil emulsion. Any method which distributes and suspends the particulate material in the emulsion can be employed, e.g., using mixer equipment described in such patents as U.S. Pat. Nos. 4,614,435, 4,671,665, 4,886,367, 4,802,141, 4,850,701 and 4,919,540, the teachings of which are incorporated herein by reference. However, the resulting emulsion and its properties may depend on the method of addition. In one method for adding the sand or other particulate material to the emulsion, a high shear mixer such as a PODrM blender (U.S. Pat. Nos. 4,614,435 and 4,671,665) can be employed. The emulsions of the present invention are stable even at the high rates of shear exhibited in this equipment, even as conventional untreated frac sand is continuously blended into the emulsion "on the fly" as the fracturing fluid is pumped down-hole. Alternatively, the sand can be mixed with the emulsion mixture using equipment which does not generate such high rates of shear.

The water-in-oil emulsions can generally be employed using conventional well treatment techniques.

In practicing the method of the present invention for fracturing a formation, the water-in-oil emulsion is advantageously prepared above ground, the particulate proppant material is added to the emulsion as needed, then the emulsion is pumped into the well bore and flowed to the desired location in the subterranean formation. The water-in-oil emulsion is delivered to the desired location in the subterranean formation using techniques well-known in the art and reference is made thereto for the purposes of this invention. In general, once a formation has been fractured and the proppant placed in the fracture, the water-in-oil emulsion can be removed from the formation and the well bore. Often, during this period, the water-in-oil emulsion will break and revert to a two-phase fluid of oil and water. The two phases result in much lower viscosity, thereby facilitating removal of the fluid from the well bore.

In using the water-in-oil emulsion as a drilling fluid, the water-in-oil emulsion is employed to remove the chips or cuttings produced by the rotating drill bit or provide a lubricating medium for the drill bit and drill pipe. In operation, the emulsion is pumped down the drill pipe through the drill bit where it will pick up the cuttings and be returned to the surface between the drill pipe and the wall of the well bore. As such, in operation, the water-in-oil emulsion is added to the drill pipe and the particulate material, in the form of chips or cuttings formed by the rotating drill bit, are incorporated and carried to the surface by the water-in-oil emulsion.

The following examples are presented to illustrate the present invention and should not be construed to limit its scope. In the examples, all percentages and parts are by weight unless otherwise indicated. Calculated shear rates are rounded based on significant digits. The Cowles-type mixing blade referred to in the Examples and Comparison Runs is a disk having a maximum radius of about 2.1 cm and having six tabs about 4 mm in height alternately turned upward and downward so as to be perpendicular to the disk surface. A schematic drawing of a disk impeller similar to the one used except for more tabs can be found in FIG. 22-1 of Patton, T. C. *Paint and Pigment Dispersions,* Second Ed, John Wiley & Sons, New York, 1979, pages 468–469.

EXAMPLE 1

To an 8-ounce (0.237 L) round glass bottle is added 1 gram (g) of bis (2-hydroxyethyl) erucyl amine obtained as Kemamine AS-298 from Humko Chemical Division, Witco Corporation and, 15 mL (12.68 g) of diesel oil. This quickly becomes a solution of the surfactant in the diesel oil.

A Cowles-type mixing blade which is attached to an air motor is lowered into the glass bottle containing the diesel oil/bis (2-hydroxyethyl) erucyl amine surfactant solution until it is just above the surface of the bottom of the glass bottle. This Cowles blade has a maximum radius of about 2.1 cm and the radius of the bottle is about 2.5 cm. The air motor is turned on and the speed is increased to about 500 rpm (calculated shear rate of 300 $\sec^{-1}$).

To the solution is added 4 mL of deionized water into the vortex created by the Cowles blade and the emulsion is mixed for about 5 minutes. The speed of the Cowles blade is then adjusted to 2000 rpm (calculated shear rate of 1200 $\sec^{-1}$). Subsequently, 131 mL of deionized water is added into the vortex created by the Cowles blade. This addition requires about an additional 10 minutes. An emulsion forms as is evidenced by the change in color from dark solution to a milky dispersion. During the water addition, as the volume of the liquid in the bottle increases, the bottle is lowered in order to maintain a well-defined vortex into which the water is added. At the end of the addition of the water, the bottle containing the emulsion is raised and lowered several times in order to expose the entire emulsion to the rotating Cowles blade to insure that the emulsion is uniform. The resulting emulsion is a stable, viscous, water-in-oil emulsion, having a yield value, with a tan to gray color.

The emulsion is allowed to sit for about one month at ambient temperatures (about 23° C.). At that time, there had been no visual separation of the oil and aqueous liquid phases. 74 g of the emulsion is added to a second 8-ounce (0.237 L) bottle. The Cowles-type mixing blade attached to an air motor is lowered into the glass bottle containing the emulsion until it is just above the surface of the bottom of the glass bottle. The air motor is turned on and the blade speed is increased to about 6500 rpm (calculated shear rate of 4000 $\sec^{-1}$). Subsequently, 196.1 g of a 20/40 mesh (850 µm/425 µm) untreated sand (sand having a particle size such that it passes through a 20 mesh screen but is collected by a 40 mesh screen) is added to the vortex created by the mixer. The viscosity of the dispersion increases upon sand addition. The sand is mixed by moving the spinning blade up and down through the emulsion by raising and lowering the jar. The emulsion does not break during this high shear mixing.

EXAMPLE 2

To an 8-ounce (0.237 L) round glass bottle is added 0.5 g of bis(2-hydroxyethyl) oleyl amine sold as Ethomeen 0/12 by AKZO Chemicals Inc., 0.5 g of a sulfonated $C_{20-24}$ alkylated toluene sold as Aristol F sulfonic acid from Pilot Chemical Company and, 15 mL (12.68 g) of diesel oil. The resulting mixture is placed on a shaker table at a low speed to form a solution.

A Cowles-type mixing blade identical to that used in Example 1 which is attached to an air motor is lowered into the glass bottle containing the resulting diesel oil/surfactant solution until it is just above the surface of the bottom of the glass bottle. The air motor is turned on and the speed is increased to about 2000 rpm (calculated shear rate of 1200 $\sec^{-1}$).

To the solution is added drop wise 135.06 g of deionized water into the vortex created by the Cowles blade. The addition of all the water requires about 10 minutes. A water-in-oil emulsion of tan color results. As indicated by the swirl tips on its surface that do not flow out, the resulting emulsion has a yield value, but the emulsion is easily moved with the spatula (like shaving cream) indicating that it is shear thinning. After sitting overnight (about 16 hours) the emulsion's yield value is reduced significantly and it flows easily when the bottle is tipped.

After allowing the emulsion to sit overnight, 49.33 g of the emulsion is added to a second 8 ounce (0.237 L) bottle. The Cowles-type mixing blade attached to an air motor is lowered into the glass bottle containing the emulsion until it is just above the surface of the bottom of the glass bottle. The air motor is turned on and the blade speed is increased to about 6500 rpm (calculated shear rate of 4000 $\sec^{-1}$). Subsequently, 130.7 g of a 20/40 mesh (850 µm/425 µm) untreated sand is added to the vortex created by the mixer. The viscosity of the dispersion again increases upon sand addition. The sand is mixed by moving the spinning blade up and down through the emulsion by raising and lowering the jar.

The emulsion does not break during this high shear mixing.

After this sand bearing emulsion is allowed to sit overnight (approximately 16 hours) the viscosity of the sand dispersion is reduced significantly and it flows easily when the bottle is tipped. However, the dispersion is still more viscous than the viscosity of emulsion without the sand. No liquid separated from the dispersion upon sitting overnight.

EXAMPLE 3

A water-in-oil emulsion is prepared using the techniques of Example 1 except that 0.5 g of the sulfonated $C_{20-24}$ alkylated toluene sold as Aristol F and 0.5 g of bis (2-hydroxyethyl) erucyl amine sold as Kemamine AS-298 are employed as the surfactants. The resulting water-in-oil emulsion is a tan color and, as indicated by the swirl tips on its surface, the resulting emulsion (like shaving cream) has a yield value but the emulsion is easily moved with the spatula indicating that it is shear thinning. After preparation, the emulsion is placed in a forced-air oven heated to 80° C. for a 5 hour period. At the end of that time, there is no visual breaking of the emulsion. After 10 hours at 80° C., the emulsion remained stable with a few, small drops of water appearing on the bottle wall.

EXAMPLE 4

A water-in-oil emulsion is prepared using the techniques of Example 1 except that 1.0 g of a butylene oxide/ethylene oxide/butylene oxide triblock copolymer with a central core of about 25 ethylene oxide units and blocks of about 29 butylene oxide units on each end plus 0.50 g of g N-tallow-1,3-diaminopropane sold as Duomeen T by Akzo Noble are employed as the surfactants and except that 135 ml of 2 wt % potassium chloride aqueous solution are used rather than deionized water. After its preparation, the emulsion is placed in a pressure vessel and heated in a forced air oven for 2.5 hours at 135° C. At the end of that time, there is only small (less than about 10 percent by volume) of a separate aqueous phase present.

COMPARISON RUNS

Two high internal phase water-in-oil emulsions were prepared with 135 mL deionized water in 15 mL diesel oil. One was stabilized with 1.0 g of Hypermer E464 polymeric surfactant per 15 mL of diesel oil. The Hypermer E464 from ICI Americas, Wilmington, Del. is described in U.S. Pat. No. 5,663,220. The second emulsion was stabilized with 0.5 g of Aristol F monoalkylated toluene sulfonic acid having an alkyl chain length of $C_{20-24}$ per 15 mL of diesel oil. To 74 grams of each emulsion was added 196 g of 20/40 mesh (850 $\mu$m/425 $\mu$m) untreated frac sand while the respective emulsion was being mixed in an 8 oz round bottle with a Cowles-type mixer at approximately 6500 rpm (calculated shear rate of 4000 $sec^{-1}$). A change in the vortex was observed in each test during the sand addition and a low viscosity liquid layer about one cm in thickness was observed on top of the sand dispersion soon after agitation was stopped, indicating both of these emulsions broke during the addition of the sand.

What is claimed is:

1. A fluid for treating subterranean formations comprising a water-in-oil emulsion comprising from about 1 to about 10 volume percent oil phase and from about 99 to about 90 volume percent aqueous liquid phase, based on the total volume of aqueous liquid and oil in the emulsion, a first surfactant comprising an amine or amine oxide soluble in the oil phase of the emulsion and having the formula:

(I)

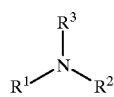

or a protonated form thereof (II)

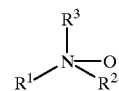

wherein $R^3$ is a hydrocarbyl or substituted hydrocarbyl having from about 8 to about 30 carbon atoms, and —$R^1$ and —$R^2$ are independently hydrogen, hydrocarbyl or substituted hydrocarbyl having up to 30 carbon atoms, and at least one secondary surfactant wherein the secondary surfactant is at least one hydrocarbon soluble surfactant of the formula:

(III)

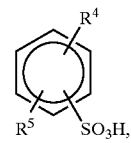

(IV)

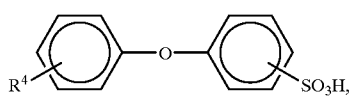

and sulfonate salts of an acid of Formula III or IV, wherein $R^4$ is a hydrocarbyl or substituted hydrocarbyl having from 18 to 30 carbon atoms and $R^5$ is hydrogen, —$CH_3$ or —$C_2H_5$, in which the major component of Formula III comprises a trisubstituted benzene in which if $R_5$ is —$CH_3$ or —$C_2H_5$, $R^4$ and $R^5$ are para to each other and in which the sulfonic acid group is ortho to $R^5$ and if $R^5$ is hydrogen the sulfonic acid group is para to $R^4$.

2. The well treatment fluid of claim 1 wherein the emulsion comprises from about 1 to about 2 volume percent oil phase and from about 99 to about 98 volume percent aqueous liquid phase, based on the total volume of aqueous liquid and oil in the emulsion.

3. The well treatment fluid of claim 2 which further comprises untreated sand having a particle size which passes through a 20 mesh (850 $\mu$m) screen but which is collected by a 40 mesh (425 $\mu$m) screen.

4. A fluid for treating subterranean formations comprising a water-in-oil emulsion comprising from about 1 to about 10 volume percent oil phase and from about 99 to about 90 volume percent aqueous liquid phase, based on the total volume of aqueous liquid and oil in the emulsion, a first surfactant comprising an amine or amine oxide soluble in the oil phase of the emulsion and having the formula:

(I)

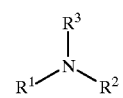

or a protonated form thereof

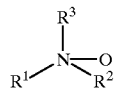
(II)

wherein $R^3$ is a hydrocarbyl or substituted hydrocarbyl having from about 8 to about 30 carbon atoms, and $-R^1$ and $-R^2$ are independently hydrogen, hydrocarbyl or substituted hydrocarbyl having up to 30 carbon atoms, and erucic acid as a secondary surfactant.

5. A fluid for treating subterranean formations comprising a water-in-oil emulsion comprising from about 1 to about 10 volume percent oil phase and from about 99 to about 90 volume percent aqueous liquid phase, based on the total volume of aqueous liquid and oil in the emulsion, a first surfactant comprising an amine or amine oxide soluble in the oil phase of the emulsion and having the formula:

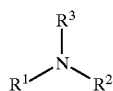
(I)

or a protonated form thereof

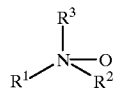
(II)

wherein $R^3$ is a hydrocarbyl or substituted hydrocarbyl having from about 8 to about 30 carbon atoms, and $-R^1$ and $-R^2$ are independently hydrogen, hydrocarbyl or substituted hydrocarbyl having up to 30 carbon atoms, and at least one secondary surfactant wherein the secondary surfactant is at least one surfactant selected from the group consisting of (a) an effective amount of a block or graft copolymer having the general formula $(A-COO)_m B$, where m is an integer of at least 2, A is a polymeric component having a molecular weight of at least five hundred and is the residue of an oil-soluble complex monocarboxylic acid and B is a polymeric component having a molecular weight of at lest five hundred and comprises a water soluble polyalkylene glycol, (b) the reaction product of a polyalk(en)yl succinic anhydride and a polar compound having at least one hydroxyl or amino group and (c) mixtures of (a) and (b).

6. A fluid for treating subterranean formations comprising a water-in-oil emulsion comprising from about 1 to about 10 volume percent oil phase and from about 99 to about 90 volume percent aqueous liquid phase, based on the total volume of aqueous liquid and oil in the emulsion, a first surfactant comprising an amine or amine oxide soluble in the oil phase of the emulsion and having the formula:

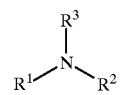
(I)

or a protonated form thereof

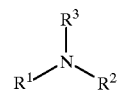
(II)

wherein $R^3$ is a hydrocarbyl or substituted hydrocarbyl having from about 8 to about 30 carbon atoms, and $-R^1$ and $-R^2$ are independently hydrogen, hydrocarbyl or substituted hydrocarbyl having up to 30 carbon atoms, and at least one secondary surfactant wherein the secondary surfactant is at least one block copolymer of butylene oxide/ethylene oxide/butylene oxide.

7. A fluid for treating subterranean formations comprising a water-in-oil emulsion comprising from about 1 to about 10 volume percent oil phase and from about 99 to about 90 volume percent aqueous liquid phase, based on the total volume of aqueous liquid and oil in the emulsion, a first surfactant comprising an amine or amine oxide soluble in the oil phase of the emulsion and having the formula:

(I)

wherein $R^3$ is a hydrocarbyl or substituted hydrocarbyl having from about 8 to about 30 carbon atoms, and $-R^1$ and $-R^2$ are independently hydrogen, $-CH_3$, $-C_2H_5$, $-C_3H_7$, $-(C_2H_4)OH$, or $-CH_2CH(CH_3)OH$ provided $-R^1$ and $-R^2$ are not both hydrogen, and at least one secondary surfactant comprising a hydrocarbon soluble surfactant of the formula:

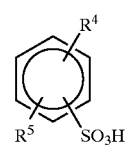
(III)

wherein $R^4$ is a hydrocarbyl or substituted hydrocarbyl having from 20 to 30 carbon atoms and $R^5$ is hydrogen, $-CH_3$ or $-C_2H_5$, where $R^4$ and $R^5$ are para to each other and in which the sulfonic acid group is ortho to $R^5$.

8. The well treatment fluid of claim 1, 4, 5, 6 or 7 which further comprises a particulate material.

9. The well treatment fluid of claim 8 wherein the particulate material is sand.

10. A method for fracturing a subterranean formation which comprises injecting into the formation, at a pressure sufficient to fracture the formation, a water-in-oil emulsion comprising a first surfactant comprising an amine or amine oxide having the formula:

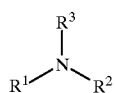

(I)

or a protonated form thereof

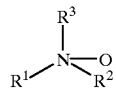

(II)

wherein $R^3$ is a hydrocarbyl or substituted hydrocarbyl having from about 8 to about 30 carbon atoms, and $R^1$ and $R^2$ are independently hydrogen, hydrocarbyl or substituted hydrocarbyl having up to 30 carbon atoms.

11. The method of claim 10 wherein the first surfactant is

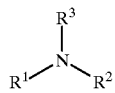

(I)

wherein $R^3$ is a hydrocarbyl or substituted hydrocarbyl having from about 8 to about 30 carbon atoms, and $R^1$ and $R^2$ are independently hydrogen, —$CH_3$, —$C_2H_5$, —$C_3H_7$, —$(C_2H_4)OH$, or —$CH_2CH(CH_3)OH$ provided —$R^1$ and —$R^2$ are not both hydrogen.

12. The method of claim 10 wherein the emulsion comprises from about 1 to about 10 volume percent oil phase and from about 99 to about 90 volume percent aqueous liquid phase, based on the total volume of aqueous liquid and oil in the emulsion, and wherein the emulsion further comprises a proppant.

13. The method of claim 12 wherein $R^1$ and $R^2$ are independently hydrogen, —$CH_3$, —$C_2H_5$, —$C_3H_7$, —$(CH_2CH_2—O)_nH$, or —$[CH_2CH(CH_3)O]_nH$, wherein n is 1 to 4.

14. The method of claim 12 wherein the emulsion further comprises at least one secondary surfactant selected from the group consisting of
(i) at least one hydrocarbon soluble surfactant selected from the group consisting of:

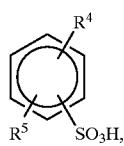

(III)

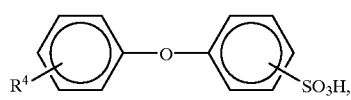

(IV)

and sulfonate salts of an acid of Formula III or IV, wherein $R^4$ is a hydrocarbyl or substituted hydrocarbyl having from 18 to 30 carbon atoms and $R^5$ is hydrogen, —$CH_3$ or —$C_2H_5$, in which the major component of Formula III comprises a substituted benzene in which if $R^5$ is —$CH_3$ or —$C_2H_5$, $R^4$ and $R^5$ are para to each other and the sulfonic acid group is ortho to $R^5$ and if $R^5$ is hydrogen the sulfonic acid group is para to $R^4$;

(ii) at least one hydrocarbon soluble, long-chain carboxylic acid surfactant of the formula RCOOH, wherein R is a hydrocarbyl or substituted hydrocarbyl having from 18 to 30 carbon atoms;

(iii) at least one surfactant selected from the group consisting of
(a) an effective amount of a block or graft copolymer having the general formula $(A—COO)_mB$, where m is an integer of at least 2, A is a polymeric component having a molecular weight of at least five hundred and is the residue of an oil-soluble complex monocarboxylic acid and B is a polymeric component having a molecular weight of at lest five hundred and comprises a water soluble polyalkylene glycol,
(b) the reaction product of a polyalk(en)yl succinic anhydride and a polar compound having at least one hydroxyl or amino group and
(c) mixtures of (a) and (b); and (iv) at least one block copolymer of butylene oxide/ethylene oxide/butylene oxide.

15. The method of claim 14 wherein the emulsion comprises from about 1 to about 5 volume percent oil phase and from about 99 to about 95 volume percent aqueous liquid phase, based on the total volume of aqueous liquid and oil in the emulsion.

16. The method of claim 14 wherein the secondary surfactant is at least one hydrocarbon soluble surfactant selected from the group consisting of:

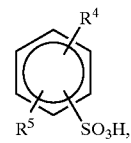

(III)

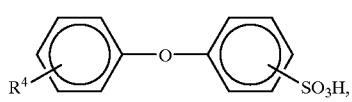

(IV)

and sulfonate salts of an acid of Formula III or IV, wherein $R^4$ is a hydrocarbyl or substituted hydrocarbyl having from 18 to 30 carbon atoms and $R^5$ is hydrogen, —$CH_3$ or —$C_2H_5$, in which the major component of Formula III comprises a substituted benzene in which if $R^5$ is —$CH_3$ or —$C_2H_5$, $R^4$ and $R^5$ are para to each other and the sulfonic acid group is ortho to $R^5$ and if $R^5$ is hydrogen the sulfonic acid group is para to $R^4$.

17. The method of claim 16 wherein the emulsion comprises from about 1 to about 2 volume percent oil phase and from about 99 to about 98 volume percent aqueous liquid phase, based on the total volume of aqueous liquid and oil in the emulsion.

18. The method of claim 14 wherein the secondary surfactant is at least one hydrocarbon soluble, long-chain carboxylic acid surfactant of the formula RCOOH, wherein R is a hydrocarbyl or substituted hydrocarbyl having from 18 to 30 carbon atoms.

19. The method of claim 18 wherein the hydrocarbon soluble long-chain carboxylic acid surfactant is erucic acid.

20. The method of claim 14 wherein the secondary surfactant is at least one surfactant selected from the group consisting of
   (a) an effective amount of a block or graft copolymer having the general formula $(A-COO)_m B$, where m is an integer of at least 2, A is a polymeric component having a molecular weight of at least five hundred and is the residue of an oil-soluble complex monocarboxylic acid and B is a polymeric component having a molecular weight of at lest five hundred and comprises a water soluble polyalkylene glycol,
   (b) the reaction product of a polyalk(en)yl succinic anhydride and a polar compound having at least one hydroxyl or amino group and
   (c) mixtures of (a) and (b).

21. The method of claim 14 wherein the secondary surfactant is at least one block copolymer of butylene oxide/ethylene oxide/butylene oxide.

22. The method of claim 12, 16, 18, 19, 20, or 21 wherein the proppant comprises untreated sand and the method includes the step of continuously blending the sand into the emulsion as the emulsion is pumped down-hole.

\* \* \* \* \*